Aug. 4, 1970         P. R. DELAPLACE         3,523,080
FRICTION ELEMENTS, IN PARTICULAR FOR HINGES AND BEARINGS
Filed Nov. 18, 1965
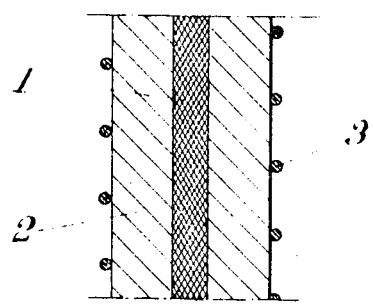

United States Patent Office 3,523,080
Patented Aug. 4, 1970

3,523,080
FRICTION ELEMENTS, IN PARTICULAR FOR
HINGES AND BEARINGS
Paul René Delaplace, 37 Rue de Chateaudun,
Paris, France
Filed Nov. 18, 1965, Ser. No. 512,260
Claims priority, application France, Nov. 20, 1964,
995,771
Int. Cl. C10m 5/00
U.S. Cl. 252—12.4                              15 Claims

ABSTRACT OF THE DISCLOSURE

The friction element comprises a mass of fibrous material impregnated both with a polymerized resin and with a lubricant of melting point higher than 70° C. and preferably higher than 80° C. The lubricant contains derivatives or mixtures of higher fatty acids and higher fatty alcohols. Preferably the fibrous material comprises asbestos and the lubricant comprises carnauba wax.

---

The present invention relates to friction elements intended to cooperate with working surfaces in relative rotation with respect to one another, as it is in particular the case for hinges, bearings, and the like, said elements being essentially constituted by a support of fibres, in particular asbestos fibres, impregnated with a synthetic resin (or other material) and with a lubricant.

The chief object of my invention is to provide a friction element of this type which is better adapted to resist the action of external agents, such as in particular water, dust, sand, etc.

My invention consists chiefly in making use, as lubricants, in such elements, of materials having a relatively high melting point, in particular a melting point higher than 70° C., and preferably higher than 80° C., and, in particular, in utilizing derivatives or mixtures of higher fatty acids and higher fatty alcohols such as are found in particular in some waxes, more especially carnauba wax (myricyl alcohol, ceryl alcohol, cerotic acid, myricyl cerotate).

According to another feature of the present invention, the support of the elements according to the present invention consists of long unwoven asbestos fibres.

Still another feature consists in making said support of asbestos yarns woven with a textile material, possibly with an external lining of lead wires or wires of another soft metal or alloy.

Still another feature consists in choosing, as resin, a poly-epoxy resin (of the kind of that known under the trade mark "Araldite"), this resin permitting polymerization at low temperature and pressure.

A preferred embodiment of my invention will be hereinafter described with reference to the appended drawing, given merely by way of example and which diagrammatically shows an asbestos yarn to be treated according to the present invention.

It should first be reminded that in the French Pat. No. 1,194,623, filed Apr. 11, 1958, I have already described a method for the manufacture of such elements which consists in using a support of a material, in particular consisting chiefly of asbestos, impregnated, on the one hand, with a resin or other substance (phenol resin, etc.) to be hardened subsequently by polymerization or other treatment, and, on the other hand, with a lubricant, in particular a liquid one, such as ox-foot oil.

According to the prior method the piece was obtained from a support impregnated both with resin or an equivalent substance and with a lubricant, the rough product being then molded into the shape of the piece to be obtained, and polymerized at suitable temperature and pressure.

Experience taught that products obtained in this way may, after a time, lose part of their efficiency. As a matter of fact it was found that, when in contact with water, the liquid lubricant has a tendency to form a film which therefore constitutes a leak. The same happens in the case of contact with dry powders such as sand or various dusts, these powders tending to become impregnated with the lubricant by capillarity and to extract it from the product.

According to the present invention, I make use of a lubricant which is in the solid state at ordinary temperature and even the melting temperature of which is higher than 70° C., and even 80° C., and possibly even 85° C.

Such lubricants, due to their high melting point, do not leak into water or disappear by capillarity when in contact with powdery materials, which does not prevent them from forming by friction a bright film over working surfaces.

It is possible, for anyone skilled in the art, to find, in particular among waxes, greases, fatty alcohols and fatty acids, bodies or mixture of bodies complying with these conditions.

It is known that the higher fatty alcohols and the higher fatty acids that is to say alcohols and acids having a high molecular weight, and also their derivatives, have melting points considerably higher than the ambient temperature. It seems advantageous to choose waxes, which are essentially esters of higher fatty acids and higher fatty alcohols. Carnauba wax seems to be particulary suitable for this purpose. It contains a mixture of myricyl alcohol, ceryl alcohol, cerotic acid and myricyl cerotate, and its melting point is higher than 80° C. and may be as high as 85° C.

Of course I may use either natural waxes or mixtures of synthetic products, that is to say the above mentioned acids and alcohols.

Concerning the weight of lubricant to be used, it may range within wide limits, for instance between 1 and 10% by weight of the product to be obtained.

The impregnation operation is effected in the hot state, for instance at temperatures ranging from 120 to 180° C., either by dipping or by injection, or again with the addition of a volatile solvent (wherein the lubricating mixture would be atomized in the hot state) such in particular as carbon tetrachloride or trichloroethylene or the like, possibly under pressure.

In some cases the addition of other substances the melting point of which may be as high or lower, may be considered. Thus hard paraffin may be added, for instance in the proportion of 10% of the weight of wax, the melting point of this paraffin being higher than 55° C. I may also add higher fatty acids such as stearic acid, arachidic acid, etc.

Concerning the nature of the support to be impregnated, I may, as already indicated in my prior patent, use suitably folded or wound strips of asbestos fabric.

But it is advantageous, in the many cases where it is not requested to have a reinforcement in predetermined directions to make use of unwoven long asbestos fibres (of a length ranging for instance from 10 cm. to 40 cm., but which may however be lower than 10 cm., for instance from 2 to 10 cm.), that is to say from unwoven asbestos suitably impregnated, polymerized and compressed, this feature being applied whatever be the type of lubricant that is used.

If the lubricant is a wax I will proceed with impregnation of the mass by means of the lubricant, either before or after impregnation by the thermo-hardening resins. Then, this mass of fibres having been given the desired shape by molding, polymerization will be performed, that is to say the hardening of the impregnated mass, and this through any known methods, for instance in the case of phenolic resins, at a temperature of 160° C. under pressures ranging from 200 to 1000 kgs./cm².

I may also, according to another feature of the invention, use, for making the support, asbestos yarns or the like (glass fibres for instance) woven with a textile material, such as cotton, in which case the impregnation with wax will take place mainly on said textile material.

The asbestos yarn is therefore made in the usual manner, with a textile core 1 and an asbestos lining 2, but impregnation is preferably performed in advance on the textile yarn 1 before the manufacture of the complex yarn, that is to say before the fibres 2 are added. Then the whole (in which the yarns may be woven or not woven) is dipped into the resin after which the molding and polymerization operations are performed.

The asbestos or other yarn with a textile core will be chosen for instance to constitute from 40 to 65% of the total weight P of the product to be obtained, whereas the amount of wax used for the impregnation of said yarn will range for instance from 3 to 4% of P, and the polymerized resin will range from 30 to 60% thereof.

The proportion by weight of cotton with respect to asbestos may range from 10 to 15%. The cotton yarn 1 has for instance a diameter ranging from 0.1 to 0.5 of a millimeter the total diameter of the composite asbestos yarn 1 and 2 ranging for instance from 1 to 2 mm. as in the case of a conventional asbestos yarn.

Advantageously, I may wind about the asbestos yarn a thread of lead or another metal or alloy which is soft or has antifriction properties, such as shown at 3, this thread being of small diameter for instance ranging from 0.1 mm. to 0.2 mm.

Advantageously the resin to be polymerized is a poly-epoxy resin for instance of the kind of that designated by the trade mark "Araldite".

Such resins are advantageous for two reasons. First because waxes dissolve slightly, in the hot state, in these resins, and also because they polymerize under low pressures, averaging some kgs./cm.², and also at temperatures which are not too high, possibly in the cold state.

The manufacture of the pieces in the case where such a poly-epoxy resin is used is therefore very simple. It comprises impregnation with wax, impregnation with the epoxy resin, and molding and polymerization at low temperature and pressure.

The elements obtained according to the present invention have a higher resistance to external agents such as water, sand and dust than those known up to this time.

In a general manner my invention is not limited to the particular methods above described but it includes all modifications thereof coming within the scope of the appended claims.

What I claim is:

1. A bearing material comprising a mass of fibrous material impregnated throughout with from 30 to 60% by weight, based on the weight of the material, of a polymerized thermosetting resin and impregnated throughout at least the inner portion thereof with from 1 to 10% by weight of a lubricant having a melting point higher than 70° C. and comprising carnauba wax.

2. A bearing material according to claim 1 wherein said fibrous material comprises long unwoven asbestos fibers.

3. A bearing material according to claim 1 wherein said fibrous material comprises asbestos yarn having a core of textile material.

4. A bearing material according to claim 3 wherein said lubricant is impregnated chiefly in said core of said material.

5. A bearing material according to claim 1 wherein the mass of fibrous material is surrounded with wires of lead.

6. A bearing material according to claim 1 wherein said resin is an epoxy resin.

7. A bearing material according to claim 1 wherein said lubricant is present in an amount of from 3 to 4% by weight.

8. A bearing material according to claim 3 wherein said textile material comprises cotton.

9. A method of making a bearing material which comprises: impregnating throughout a mass of fibrous material from 30 to 60% by weight, based on the weight of the bearing material, of a polymerizable resin and impregnating throughout at least the inner portion of said mass with 1 to 10% by weight of a lubricant having a melting point higher than 70° C. and comprising carnuaba wax; and polymerizing said resin in situ to provide said bearing material.

10. A method according to claim 9 wherein impregnation with lubricant is performed by dipping the material to be impregnated into a solution comprising said lubricant.

11. A method according to claim 10 wherein said solution includes a solvent for said lubricant.

12. A method according to claim 9 wherein impregnation is performed at a temperature of from 120 to 180° C.

13. A method according to claim 9 wherein impregnation with said lubricant is performed prior to impregnation with said resin.

14. A method according to claim 9 wherein impregnation with said lubricant is performed after impregnation with said resin.

15. A method according to claim 9 wherein a mass of textile fibers making up the inner portion of the bearing material is impregnated with said lubricant before the remaining mass of fibrous material is applied.

References Cited

UNITED STATES PATENTS

| 2,074,128 | 3/1937 | Nanfeldt | 161—175 |
| 2,828,229 | 3/1968 | Sonnenschein | 161—170 |
| 3,198,691 | 8/1965 | Thomas et al. | 161—184 |
| 1,356,920 | 10/1920 | Jury | 57—162 |
| 2,494,559 | 1/1950 | Jubanowsky. | |
| 2,672,443 | 3/1954 | Serenock | 252—12.6 |
| 3,151,015 | 9/1964 | Griffith | 308—238 |
| 3,224,967 | 12/1965 | Battista | 252—12.2 |

FOREIGN PATENTS

| 698,611 | 10/1953 | Great Britain. |

ROBERT F. BURNETT, Primary Examiner

R. O. LINKER, Jr., Assistant Examiner

U.S. Cl. X.R.

161—170; 117—139.5